United States Patent
Cooley et al.

(10) Patent No.: US 9,593,701 B2
(45) Date of Patent: Mar. 14, 2017

(54) FASTENING CLIP ASSEMBLY

(71) Applicant: ILLINOIS TOOL WORKS INC., Glenview, IL (US)

(72) Inventors: Brock T. Cooley, Bloomer, WI (US); Marc R. Risdale, Dundas (CA)

(73) Assignee: Illinois Tool Works Inc., Glenview, IL (US)

( * ) Notice: Subject to any disclaimer, the term of this patent is extended or adjusted under 35 U.S.C. 154(b) by 95 days.

(21) Appl. No.: 14/426,176

(22) PCT Filed: Sep. 10, 2013

(86) PCT No.: PCT/US2013/059098
§ 371 (c)(1),
(2) Date: Mar. 5, 2015

(87) PCT Pub. No.: WO2014/043145
PCT Pub. Date: Mar. 20, 2014

(65) Prior Publication Data
US 2015/0252826 A1 Sep. 10, 2015

Related U.S. Application Data

(60) Provisional application No. 61/700,452, filed on Sep. 13, 2012.

(51) Int. Cl.
*A44B 1/04* (2006.01)
*F16B 2/20* (2006.01)
*F16B 21/08* (2006.01)

(52) U.S. Cl.
CPC .............. *F16B 2/20* (2013.01); *F16B 21/086* (2013.01); *Y10T 24/44376* (2015.01)

(58) Field of Classification Search
CPC ........ F16B 2/20; F16B 21/086; F16B 5/0657; F16B 5/0642; Y10T 24/44376; Y10T 24/309; Y10T 24/42; B60R 13/0206
See application file for complete search history.

(56) References Cited

U.S. PATENT DOCUMENTS 3,177,540 A * 4/1965 Hall ...................... F16B 21/086
24/453
3,190,167 A * 6/1965 Holton ...................... F16B 2/20
411/349

(Continued)

FOREIGN PATENT DOCUMENTS

CN 101566184 A 10/2009
DE 29708112 U1 7/1997

(Continued)

OTHER PUBLICATIONS

ISR and WO for PCT/US2013/059098 mailed Nov. 13, 2013.

*Primary Examiner* — Victor Batson
*Assistant Examiner* — Matthew Sullivan
(74) *Attorney, Agent, or Firm* — Joseph M. Butscher; The Small Patent Law Group, LLC

(57) ABSTRACT

A fastening clip assembly is configured to securely connect a first panel to a second panel. The fastening clip assembly may include a collar, a securing support extending from the collar, and deflectable beams connected to the securing support. The deflectable beams are configured to move in first and second directions when the deflectable beams are mated with one or both of the first and second panels. The first direction differs from the second direction.

18 Claims, 3 Drawing Sheets

(56) References Cited

U.S. PATENT DOCUMENTS

| | | | | |
|---|---|---|---|---|
| 4,987,656 A * | 1/1991 | Sato | ............... | F16B 21/09 24/297 |
| 5,039,040 A * | 8/1991 | Idjakiren | ............... | F16B 21/086 24/297 |
| 5,592,719 A * | 1/1997 | Eto | ............... | F16B 21/086 24/297 |
| 5,658,110 A * | 8/1997 | Kraus | ............... | B62D 25/24 411/508 |
| 6,086,306 A * | 7/2000 | Bakker | ............... | F16B 19/004 24/297 |
| 6,305,055 B1 | 10/2001 | Castro | | |
| 6,974,292 B2 | 12/2005 | Hansen | | |
| 7,306,419 B2 * | 12/2007 | Lepper | ............... | F16B 21/086 411/453 |
| 8,393,058 B2 * | 3/2013 | Okada | ............... | B60R 13/0206 24/297 |
| 8,438,707 B2 * | 5/2013 | DeGelis | ............... | F16B 21/086 24/297 |
| 8,601,647 B2 * | 12/2013 | Hasegawa | ............... | F16B 21/086 24/297 |
| 8,806,722 B2 * | 8/2014 | Iwahara | ............... | F16B 21/086 24/297 |
| 8,979,460 B2 * | 3/2015 | Ostergren | ............... | F16B 21/084 24/453 |
| 9,328,759 B2 * | 5/2016 | Kuhm | ............... | B60R 13/0206 |
| 2005/0244250 A1 | 11/2005 | Okada et al. | | |
| 2006/0207068 A1 | 9/2006 | Lepper | | |
| 2008/0066266 A1 | 3/2008 | Scroggie et al. | | |
| 2009/0022567 A1 * | 1/2009 | Huet | ............... | F16B 21/086 411/363 |
| 2009/0252573 A1 | 10/2009 | Nakazato | | |
| 2011/0072624 A1 | 3/2011 | Iwahara et al. | | |
| 2012/0023715 A1 | 2/2012 | Nakajima | | |
| 2012/0131770 A1 * | 5/2012 | Iwahara | ............... | F16B 21/086 24/458 |
| 2012/0213609 A1 | 8/2012 | Moerke | | |
| 2013/0129450 A1 * | 5/2013 | Aoki | ............... | B29C 45/44 411/509 |
| 2015/0059133 A1 * | 3/2015 | Hirakawa | ............... | F16B 2/20 24/458 |
| 2015/0135484 A1 * | 5/2015 | Leverger | ............... | F16B 21/086 24/292 |
| 2015/0191131 A1 * | 7/2015 | Yamamoto | ............... | F16B 2/20 24/289 |
| 2015/0219138 A1 * | 8/2015 | Kuhm | ............... | F16B 21/06 403/329 |
| 2015/0337882 A1 * | 11/2015 | Iwahara | ............... | F16B 5/0657 24/489 |
| 2016/0061356 A1 * | 3/2016 | Raymond | ............... | H02G 3/32 248/73 |

FOREIGN PATENT DOCUMENTS

| | | |
|---|---|---|
| DE | 202006011580 U1 | 12/2007 |
| EP | 2306033 A1 | 4/2011 |
| EP | 2405149 A1 | 1/2012 |
| EP | 2458230 A2 | 5/2012 |
| WO | 2008033667 A1 | 3/2008 |
| WO | 2011115906 A1 | 9/2011 |
| WO | 2012073509 A1 | 6/2012 |

* cited by examiner

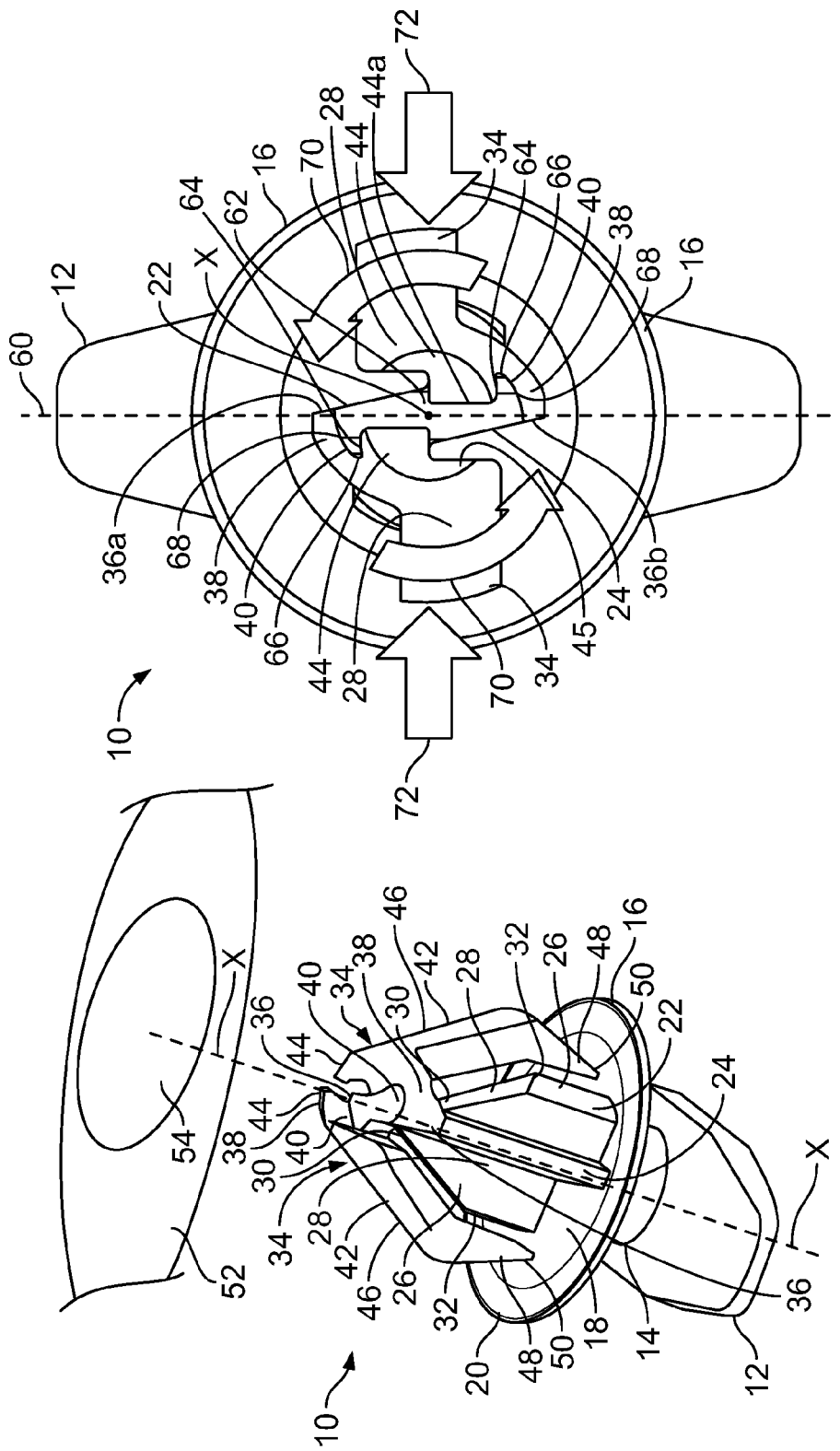

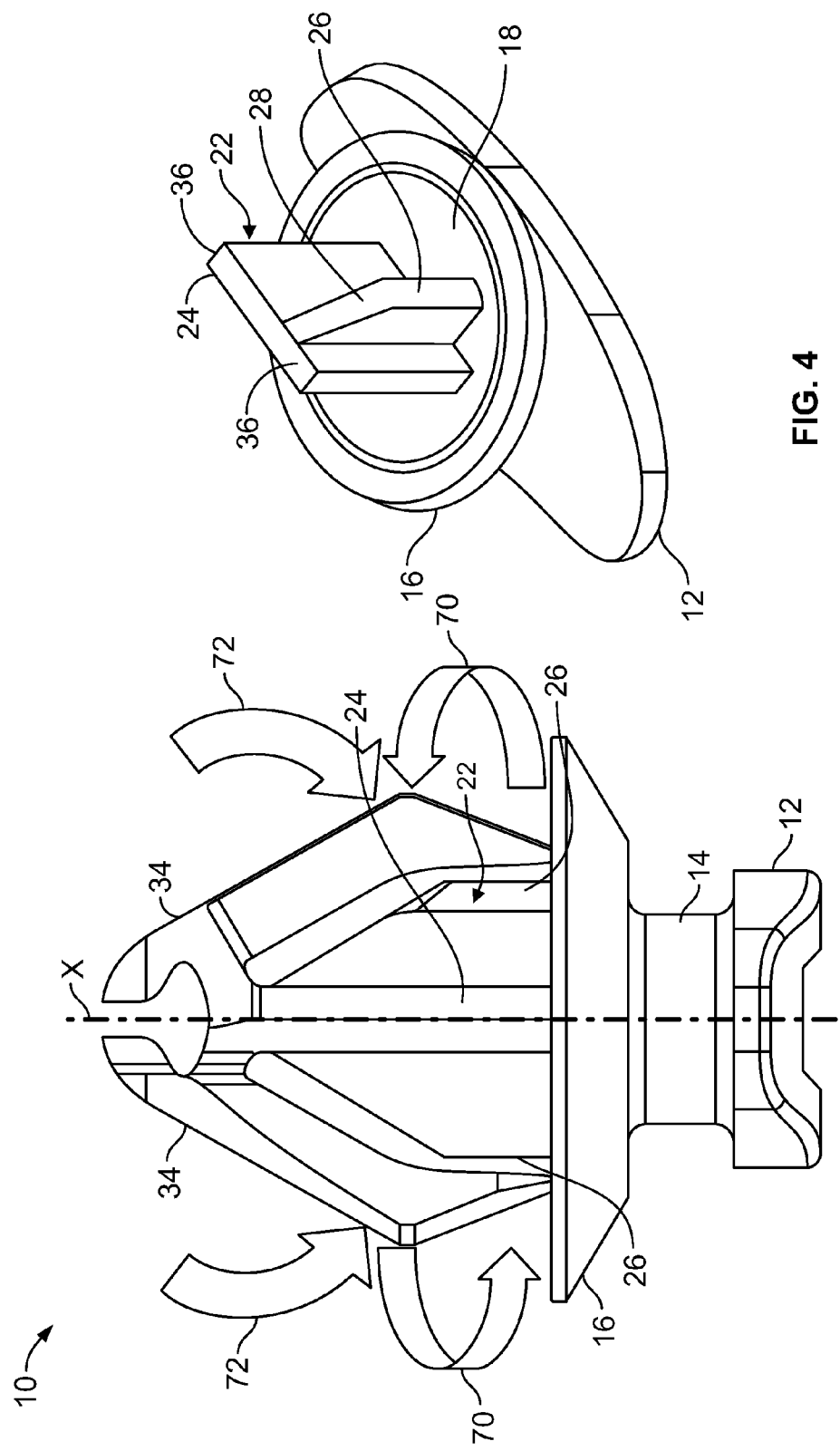

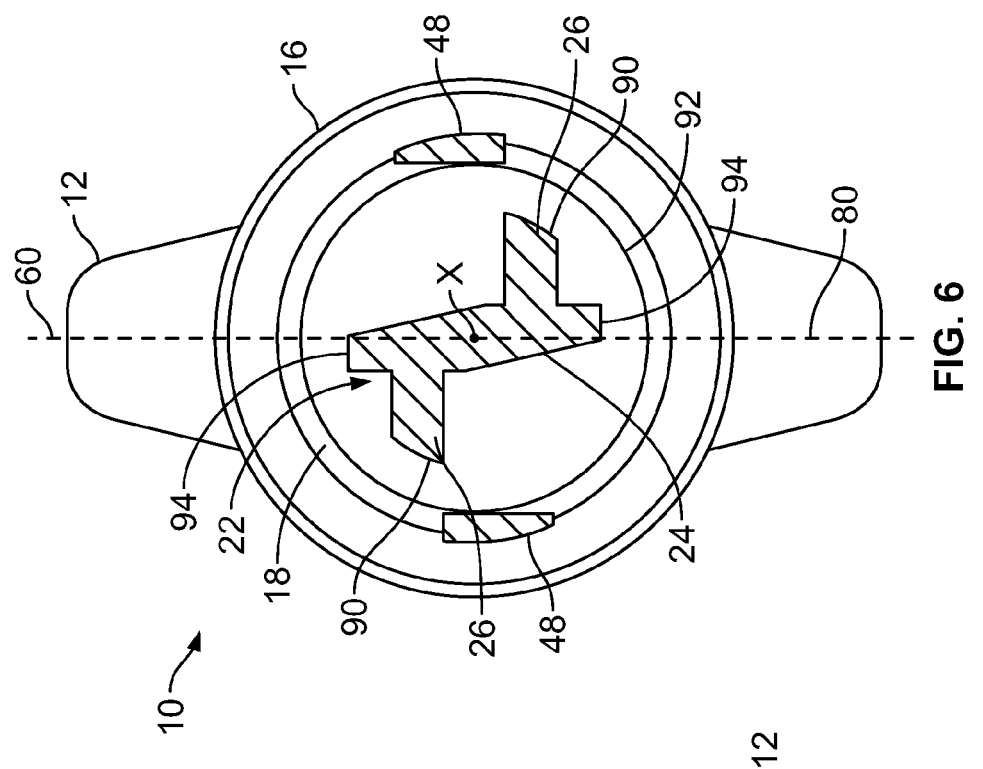
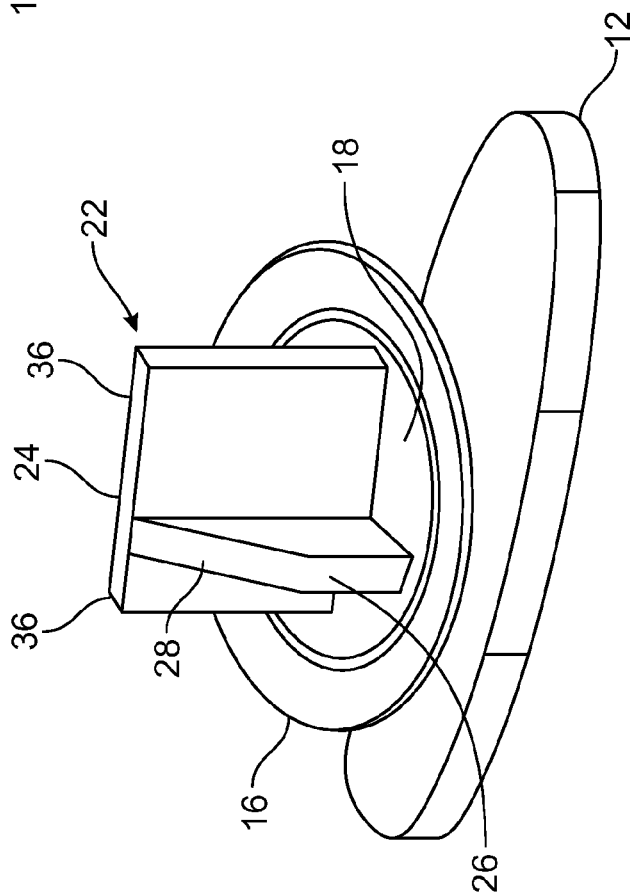

FASTENING CLIP ASSEMBLY

RELATED APPLICATIONS

The present application is a Nation Phase of International Application Number PCT/US2013/059098 filed Sep. 10, 2013 and relates to and claims priority benefits from U.S. Provisional Patent Application No. 61/700,452 filed Sep. 13, 2012, which is hereby incorporated by reference in its entirety.

FIELD OF EMBODIMENTS OF THE DISCLOSURE

Embodiments of the present disclosure generally relate to a fastening clip assembly, and more, particularly, to a fastening clip assembly configured for collapsible motion in multiple directions.

BACKGROUND

Various assemblies include panels or objects connected to one another. Automobile assemblies, for example, include various panels and structures connected to other panels or structures, or to the automobile frame itself. In particular, snap-fit assemblies may be used to connect the pieces together. Additionally, a fastener may be preassembled with one of the components or panels, while the second component or panel is connected to the preassembly during final assembly. A plurality of the fasteners may be used when connecting relatively large components together. Such fasteners have been provided in a variety of shapes and configurations suitable for the particular components to be connected.

One type of fastener used to connect components together is a symmetrical connector having an insertion portion with a W-shape. W-shape fasteners provide quick and easy assembly. Additionally, the W-shape fasteners securely retain moldings of structural panels, while also being relatively easy to remove.

The W-shape fastener typically includes a W-shaped base integrally connected to a collar. The collar is connected to a cylindrical neck, which is, in turn, connected to a planar head. Typically, the collar and the head are parallel to one another and separated from one another by the neck.

The W-shaped base includes two lateral wings having distal ends (or lead-in nose portions) integrally connected to a distal end of a central post that extends from the collar. The lateral wings angle away from the central post.

A distal tip of the W-shaped base may include a central gap or slot. The central gap allows the wings to flex laterally toward the central post when the base is being inserted into a hole formed through a panel.

The wings and lead-in nose portions are generally contiguous pieces. While the slot separates the wings and lead-in nose portions from one another, each wing and lead-in nose portion is typically a solid piece of material.

Another type of known fastener includes opposed securing members that axially collapse as the fastener is inserted into an opening of a panel. The axial collapsing of the opposed securing members allows the opposed securing members to pass through the opening.

In both known fasteners, the wings or securing members collapse typically in only one direction. For example, the W-shaped fastener collapses in lateral directions towards a central axis of the W-shaped fastener, while the other known fastener axially collapses. Further, each of the known fasteners typically provides only two points of contact with a hole diameter, thereby allowing the fasteners to pivot within the panel during insertion or extraction. As such, the range of motion of each known fastener is typically limited by a single degree of either lateral or axial freedom.

SUMMARY OF EMBODIMENTS OF THE DISCLOSURE

Certain embodiments of the present disclosure provide a fastening clip assembly configured to securely connect a first panel to a second panel. The fastening clip assembly may include a collar, a securing support extending from the collar, and deflectable beams connected to the securing support. The deflectable beams may be configured to move in first and second directions when the deflectable beams are mated with one or both of the first and second panels. The first direction differs from the second direction. The deflectable beams may be offset with respect to one another.

Each of the deflectable beams may include a lead-in nose having an arcuate notch. The notch is configured to allow each of the deflectable beams to move in one of the first or second directions.

The securing support may include an anchoring beam configured to abut into internal edge portions of one or both of the first and second panels at first and second points of contact. The securing support may also include first and second motion-limiting members extending from the anchoring beam. Each of the first and second motion-limiting members may be configured to abut into the internal edge portions of one or both of the first and second panels at third and fourth points of contact. The anchoring beam may be offset with respect to a central plane of the fastening clip assembly.

The first and second motion-limiting members may be perpendicular or parallel to a central plane of the fastening clip assembly. The anchoring beam may be non-parallel and non-perpendicular to the central plane.

The first direction may be non-orthogonal with respect to the second direction. In at least one embodiment, the first direction may include a lateral pivot with respect to a central axis of the fastening clip assembly, and the second direction may include a rotation about the central axis of the fastening clip assembly.

BRIEF DESCRIPTION OF SEVERAL VIEWS OF THE DRAWINGS

FIG. 1 illustrates an isometric top view of a fastening clip assembly, according to an embodiment of the present disclosure.

FIG. 2 illustrates a top plan view of a fastening clip assembly, according to an embodiment of the present disclosure.

FIG. 3 illustrates a front view of a fastening clip assembly, according to an embodiment of the present disclosure.

FIG. 4 illustrates an isometric top view of a securing support from a first side, according to an embodiment of the present disclosure.

FIG. 5 illustrates an isometric top view of a securing support from a second side, according to an embodiment of the present disclosure.

FIG. 6 illustrates an axial cross-sectional view of a securing support, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates an isometric top view of a fastening clip assembly 10, according to an embodiment of the present disclosure. The fastening clip assembly 10 may be integrally molded and formed a single piece. For example, the fastening clip assembly 10 may be formed from injection-molded plastic or metal. Alternatively, certain portions of the fastening clip assembly 10 may be formed from one material, while other portions of the fastening clip assembly 10 may be formed from one or more different materials.

The fastening clip assembly 10 may include a base 12 integrally connected to a central neck 14, which, in turn, integrally connects to a circumferential collar 16. The base 12 may be a flat, planar sheet, a block of material, or an irregularly-shaped piece. The neck 14 extends from a central portion of the base 12 and connects the base 12 to the collar 16. The neck 14 may be a formed as a cylinder, post, column, or the like, for example. The collar 16 may include a flat central basin 18 and an upturned rim 20 extending around the flat central basin 18. Alternatively, the collar 16 may simply be a flat sheet.

A securing support 22 extends upwardly from the flat central basin 18. The securing support 22 may include an anchoring beam 24 and motion-limiting members 26, such as ribs, fins, beams, straps, or the like extending from locations proximate to opposite ends of the anchoring beam 24. As shown, each motion-limiting member 26 may include a ramped upper edge 28 that angles down from a top portion 30 toward a middle section 32. That is, the width of each ramped upper edge 28 may be greater proximate to the middle section 32 than at the top portion 30.

Deflectable wings 34 extend from upper portions of opposite ends 36 of the anchoring beam 24. The wings 34 generally oppose one another. Each wing 34 may include an arcuate extension 38 that radially extends from an upper end 36. Notches 40 are formed through each arcuate extension 38.

Each arcuate extension 38 connects to a downwardly-angled insertion ramp 42. Each insertion ramp 42 includes a distal lead-in nose 44 (which may include the arcuate extension 38) integrally connected to a main beam 46 that angles downwardly from the lead-in nose 44 toward the collar 16. Each insertion ramp 42 may connect to a lower proximal hook 48 that downwardly extends from a lower end of the insertion ramp 42. Each proximal hook 48 may include a beveled tip 50 that is separated from the collar 16.

In operation, a portion of a panel may be securely trapped between the base 12 and the collar 16. In order to secure another panel 52 to the fastening clip assembly 10, the deflectable wings 34 are mated with the panel 52. For example, the lead-in noses 44 of the deflectable wings 34 are inserted into an opening 54 formed through the panel 52, and the deflectable wings 34 are urged into the opening 54. As the deflectable wings 34 pass into the opening 54, edges of the panel 52 that define the opening 54 slide over the insertion ramps 42 and deflect the wings 34 toward one another with respect to a central axis x of the fastening clip assembly 10. At the same time, the notches 40 formed through the distal arcuate extensions 38 allow the deflectable wings 34 to axially deflect or collapse in relation to the central axis x. With continued movement into the opening 54 of the panel 52, the proximal hooks 48 move through the opening 54. As the deflectable wings 34 pass out of the opening 54, the deflectable wings 34 laterally and axially deflect back to their at-rest positions, such that edge portions of the panel 52 that define the opening 54 are trapped between the proximal hooks 48 and the collar 16, thereby securing the panel 52 therebetween.

In the secured position, the securing support 22 prevents the panel 52 from pivoting or shifting with respect to the central axis x of the fastening clip assembly 10. As described with respect to FIG. 6, in particular, the motion-limiting members 26 and anchoring beam 24 may cooperate to securely brace the securing support 22 within the opening 54 of the panel 52, thereby preventing the securing support 22 from pivoting, shifting, or rattling therein.

FIG. 2 illustrates a top plan view of the fastening clip assembly 10, according to an embodiment of the present disclosure. The deflectable wings 34 connect to opposite upper ends 36 of the anchoring beam 24 of the securing support 22. As shown, the anchoring beam 24 is offset with respect to a central plane 60 of the fastening clip assembly 10, such that one end 36a is shifted to one side of the central plane 60, while the other end 36b is shifted to the other side of the central plane 60 (while the center 62 of the anchoring beam 24 passes through the central axis x of the fastening clip assembly 10). Alternatively, the anchoring beam 24 may be aligned with the central plane 60.

As noted above, notches 40 are formed through the extension beams 38 and/or the distal lead-in noses 44 of the deflectable wings 34. Each notch 40 may be defined by an inner curved surface 64 that connects to a transition curve 66, which may connect to an outer arcuate surface 68. The transition curve 66 may generally form a radial transition angle of approximately 180 radial degrees. However, the transition curve 66 may be greater or less than 180 radial degrees.

It has been found that the notches 40 allow the deflectable wings 34 to axially deflect about the central axis x in the direction of arcs 70 as the deflectable wings 34 are inserted into the opening 54 of the panel 52 (shown in FIG. 1). At the same time, the deflectable wings 34 may also laterally collapse toward the central axis in the direction of arrows 72. Accordingly, the deflectable wings 34 are configured to deflect, collapse, or otherwise move in multiple directions or directional movements, such as axially about the central axis x, and laterally toward the central axis x (for example, the deflectable wings 34 may laterally pivot about points proximate to their lead-in noses 44 toward and away from the central axis x). The deflectable wings 34 may deflect, collapse, or otherwise move in directions that differ from one another. For example, the directions may be non-orthogonal to one another in that the directions are non-parallel or non-perpendicular with respect to one another. As an example, one direction may be linear or parallel or perpendicular to the central plane 60, while the other direction may be rotational. As shown in FIG. 2, the direction denoted by arrows 72 may be linear in relation to the central plane 60, while the direction denoted by arcs 70 may be rotational with respect to the central axis x.

The deflectable wings 34 may be offset with respect to one another. For example, the lead-in nose 44a of one wing 34 may be aligned with a recessed area 45 in an opposite lead-in nose 44, and vice versa. The ramped upper edges 28 may be mis-aligned or otherwise offset with respect to one another. By offsetting the wings 34, as shown in FIG. 2, in particular, larger securing supports 22 may be used to fit within a given hole circumference. The larger securing supports 22 provide more material to resist peel and shear loads exerted on the fastening clip assembly 10. Greater resistance to peel and shear loads improves the effectiveness of the collar 16 by ensuring that it remains in consistent contact with a panel. Alternatively, the wings 34 may be aligned and not offset with respect to one another.

FIG. 3 illustrates a front view of the fastening clip assembly 10, according to an embodiment of the present disclosure. As explained above, the deflectable wings 34 may be configured to collapse inwardly in the direction of arcs 72 (which are shown in FIG. 2 as linear arrows), while at the same time being configured to rotationally collapse about the central axis x in the direction of arcs 70.

FIGS. 4 and 5 illustrate isometric top views of the securing support 22 from first and second sides, respectively, according to an embodiment of the present disclosure. For clarity, the deflectable wings are not shown. The anchoring beam 24 may span all or substantially all of the diameter of the flat central basin 18. Optionally, the anchoring beam 24 may span more than half, but less than the entire diameter of the central basin 18. As noted above, the anchoring beam 24 may be offset with respect to a central plane of the fastening clip assembly 10. Alternatively, the anchoring beam 24 may be aligned with the central plane.

Each motion-limiting member 26 may outwardly extend from an end portion of the anchoring beam 24. The ramped upper edges 28 of the motion-limiting members may angle down from the upper ends 36 of the anchoring beam 24 toward the central basin 18. Optionally, the motion-limiting members 26 may not include ramped upper edges.

FIG. 6 illustrates an axial cross-sectional view of the securing support 22, according to an embodiment of the present disclosure. The anchoring beam 24 may be offset with respect to the central plane 60. The anchoring beam 24 may be radially shifted with respect to a longitudinal axis 80 of the base 12. Note, the longitudinal axis 80 of the base 12 may be aligned with the central plane 60.

Each motion-limiting member 26 may outwardly extend from the anchoring beam 24. Each motion-limiting member 26 may extend from the anchoring beam 24 in a direction that is orthogonal to the central plane 60. For example, the motion-limiting members 26 may be perpendicular to the central plane 60.

The motion-limiting members 26 may include arcuate outer edges 90 that are configured to conform to a curved edge of a panel that defines an opening 92. As shown, the motion-limiting members 26 are configured to brace into the opening 92. The opposed motion-limiting members 26 may be parallel to one another, but may be offset with respect to one another, such that each extends from areas proximate to opposite ends of the anchoring beam 24. Alternatively, the motion-limiting members 26 may both extend from a mid-section of the anchoring beam. Further, the securing support 22 may include additional motion-limiting members extending from the anchoring beam 24. The additional motion-limiting members may be parallel and/or aligned with the motion-limiting members 26 shown in FIG. 6. Optionally, at least some of the additional motion-limiting members may not be parallel with the motion-limiting members 26 shown in FIG. 6.

As shown in FIG. 6, the securing support 22 is configured to contact interior edges of a panel that define the opening 92 at four points of contact. For example, the two outer edges 94 are configured to abut into the interior edges, while the arcuate outer edges 90 of the motion-limiting members 26 are also configured to abut into the interior edges. As such, the securing support 22 provides a stable and secure connection with the panel.

As described above, embodiments of the present disclosure provide a fastening clip assembly that allows for collapsible movement of deflectable wings in two directions (for example, laterally and axially) that differ from one another. The directions may be non-orthogonal to one another (for example, non-parallel and non-perpendicular with respect to one another). It has been found that the multiple collapsible range of motion of the fastening clip assembly provides greater hole diameter and panel thickness ranges for a given size of fastening clip assembly. Further, the four points of contact (with portions of a panel that define an opening into which the fastener assembly is secured) ensure that insertion and extraction forces exerted into the fastening clip assembly are applied directly and evenly. Moreover, the four points of contact allow for easy and efficient service of the fastener assembly, because pivotal movement within the opening is eliminated, minimized, or otherwise reduced.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A fastening clip assembly configured to securely connect a first panel to a second panel, the fastening clip assembly comprising:
 a collar;
 a securing support extending from the collar, wherein the securing support comprises: (a) an anchoring beam configured to abut into internal edge portions of one or both of the first and second panels at first and second points of contact; and (b) first and second motion-limiting members extending from the anchoring beam, wherein each of the first and second motion-limiting members is configured to abut into the internal edge portions of one or both of the first and second panels at third and fourth points of contact; and deflectable beams connected to the securing support, wherein the deflectable beams rotationally deflect about a central axis and laterally collapse towards the central axis in response to the deflectable beams mating with one or both of the first and second panels.

2. The fastening clip assembly of claim 1, wherein the deflectable beams are offset with respect to one another.

3. The fastening clip assembly of claim 1, wherein each of the deflectable beams comprises a lead-in nose having an arcuate notch, wherein the notch allows each of the deflectable beams to one or both of rotationally deflect about the central axis and laterally collapse towards the central axis.

4. The fastening clip assembly of claim 1, wherein each of the deflectable beams comprises an arcuate extension at an upper end, wherein a notch is formed through the arcuate extension, wherein the arcuate extension connects to a downwardly-angled insertion ramp having a distal lead-in nose integrally connected to a main beam that angles downwardly from the lead-in nose toward the collar, wherein the insertion ramp connects to a lower proximal hook having a beveled tip that is separated from the collar.

5. The fastening clip assembly of claim 1, wherein the anchoring beam is offset with respect to a central plane of the fastening clip assembly.

6. The fastening clip assembly of claim 1, wherein the first and second motion-limiting members are perpendicular or parallel to a central plane of the fastening clip assembly, and wherein the anchoring beam is non-parallel and non-perpendicular to the central plane.

7. A fastening clip assembly configured to securely connect a first panel to a second panel, the fastening clip assembly comprising:
a base;
a collar connected to the base through a neck, wherein the base and the collar are configured to secure a portion of the portion of the first panel therebetween;
a securing support extending from the collar opposite from the base, wherein the securing support comprises: (a) an anchoring beam configured to abut into internal edge portions of one or both of the first and second panels at first and second points of contact; and (b) first and second motion-limiting members extending from the anchoring beam, wherein each of the first and second motion-limiting members is configured to abut into the internal edge portions of one or both of the first and second panels at third and fourth points of contact; and
deflectable beams connected to the securing support, wherein the deflectable beams rotationally deflect inwardly about and towards a central axis and linearly collapse towards the central axis in response to the deflectable beams mating with one or both of the first and second panels.

8. The fastening clip assembly of claim 7, wherein the first and second motion-limiting members are perpendicular or parallel to a central plane of the fastening clip assembly, and wherein the anchoring beam is non-parallel and non-perpendicular to the central plane.

9. The fastening clip assembly of claim 7, wherein each of the deflectable beams comprises an arcuate extension at an upper end, wherein a notch is formed through the arcuate extension, wherein the arcuate extension connects to a downwardly-angled insertion ramp having a distal lead-in nose integrally connected to a main beam that angles downwardly from the lead-in nose toward the collar, wherein the insertion ramp connects to a lower proximal hook having a beveled tip that is separated from the collar.

10. The fastening clip assembly of claim 7, wherein the deflectable beams are offset with respect to one another.

11. The fastening clip assembly of claim 7, wherein each of the deflectable beams comprises a lead-in nose having an arcuate notch, wherein the notch allows each of the deflectable beams to one or both of rotationally deflect inwardly and about the central axis and laterally collapse towards the central axis.

12. The fastening clip assembly of claim 7, wherein the anchoring beam is offset with respect to a central plane of the fastening clip assembly.

13. A fastening clip assembly configured to securely connect a first panel to a second panel, the fastening clip assembly comprising:
a planar base;
a collar connected to the base through a neck, wherein the base and the collar are configured to secure a portion of the portion of the first panel therebetween;
a securing support extending from the collar opposite from the base, wherein the securing support comprises (a) an anchoring beam configured to abut into internal edge portions of one or both of the first and second panels at first and second points of contact, wherein the anchoring beam is offset with respect to a central plane of the fastening clip assembly, and (b) first and second motion-limiting members extending from the anchoring beam, wherein each of the first and second motion-limiting members is configured to abut into the internal edge portions of one or both of the first and second panels at third and fourth points of contact; and
offset deflectable beams connected to the securing support, wherein the deflectable beams rotationally deflect inwardly about and towards a central axis and linearly collapse towards the central axis in response to the deflectable beams mating with one or both of the first and second panels, wherein each of the deflectable beams comprises an arcuate extension at an upper end, wherein a notch is formed through the arcuate extension, wherein the arcuate extension connects to a downwardly-angled insertion ramp having a distal lead-in nose integrally connected to a main beam that angles downwardly from the lead-in nose toward the collar, wherein the insertion ramp connects to a lower proximal hook having a beveled tip that is separated from the collar.

14. The fastening clip assembly of claim 13, wherein the first and second motion-limiting members are perpendicular or parallel to a central plane of the fastening clip assembly, and wherein the anchoring beam is non-parallel and non-perpendicular to the central plane.

15. A fastening clip assembly configured to securely connect a first panel to a second panel, the fastening clip assembly comprising:
a collar;
a securing support extending from the collar; and
deflectable beams connected to the securing support, wherein the deflectable beams rotationally deflect about a central axis and laterally collapse towards the central axis in response to the deflectable beams mating with one or both of the first and second panels, wherein each of the deflectable beams comprises a lead-in nose having an arcuate notch, wherein the notch allows each of the deflectable beams to one or both of rotationally deflect about the central axis and laterally collapse towards the central axis.

16. A fastening clip assembly configured to securely connect a first panel to a second panel, the fastening clip assembly comprising:
- a base;
- a collar connected to the base through a neck, wherein the base and the collar are configured to secure a portion of the portion of the first panel therebetween;
- a securing support extending from the collar opposite from the base; and
- deflectable beams connected to the securing support, wherein the deflectable beams rotationally deflect inwardly about and towards a central axis and linearly collapse towards the central axis in response to the deflectable beams mating with one or both of the first and second panels, wherein each of the deflectable beams comprises a lead-in nose having an arcuate notch, wherein the notch allows each of the deflectable beams to one or both of rotationally deflect inwardly and about the central axis and laterally collapse towards the central axis.

17. A fastening clip assembly configured to securely connect a first panel to a second panel, the fastening clip assembly comprising:
- a collar;
- a securing support extending from the collar; and
- deflectable beams connected to the securing support, wherein the deflectable beams rotationally deflect about a central axis and laterally collapse towards the central axis in response to the deflectable beams mating with one or both of the first and second panels, wherein each of the deflectable beams comprises an arcuate extension at an upper end, wherein a notch is formed through the arcuate extension, wherein the arcuate extension connects to a downwardly-angled insertion ramp having a distal lead-in nose integrally connected to a main beam that angles downwardly from the lead-in nose toward the collar, wherein the insertion ramp connects to a lower proximal hook having a beveled tip that is separated from the collar.

18. A fastening clip assembly configured to securely connect a first panel to a second panel, the fastening clip assembly comprising:
- a base;
- a collar connected to the base through a neck, wherein the base and the collar are configured to secure a portion of the portion of the first panel therebetween;
- a securing support extending from the collar opposite from the base; and
- deflectable beams connected to the securing support, wherein the deflectable beams rotationally deflect inwardly about and towards a central axis and linearly collapse towards the central axis in response to the deflectable beams mating with one or both of the first and second panels, wherein each of the deflectable beams comprises an arcuate extension at an upper end, wherein a notch is formed through the arcuate extension, wherein the arcuate extension connects to a downwardly-angled insertion ramp having a distal lead-in nose integrally connected to a main beam that angles downwardly from the lead-in nose toward the collar, wherein the insertion ramp connects to a lower proximal hook having a beveled tip that is separated from the collar.

* * * * *